UNITED STATES PATENT OFFICE.

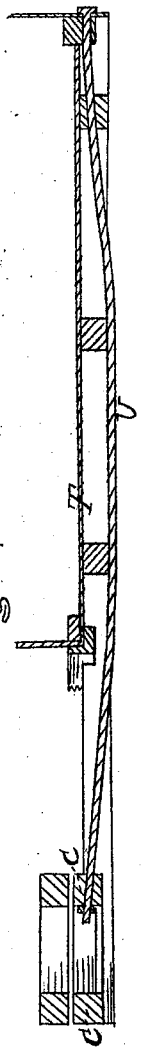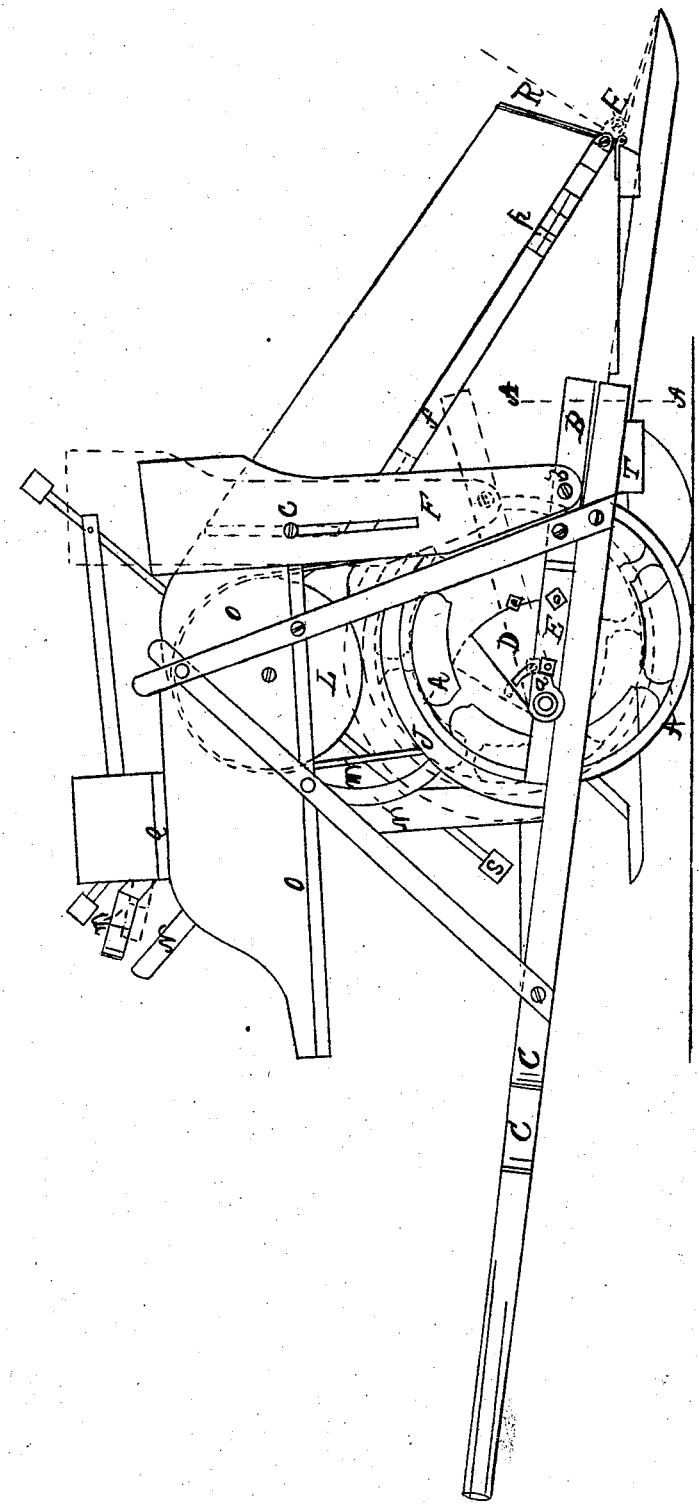

ABNER WHITELEY, OF SPRINGFIELD, OHIO.

IMPROVEMENT IN GRAIN AND GRASS HARVESTERS.

Specification forming part of Letters Patent No. 14,541, dated March 25, 1856.

*To all whom it may concern:*

Be it known that I, ABNER WHITELEY, of Springfield, in the county of Clarke and State of Ohio, have invented new and useful Improvements in Grain and Grass Harvesters; and I do hereby declare that the following is a full, clear, and exact description of the same, reference being had to the annexed drawings, making a part of this specification.

This improvement consists in bracing the finger-piece so as to make it self-supporting, connecting the frame carrying the master-wheel to the main frame by a flexible joint whose center is the same as that of the driving-pinion shaft. This I do by means of plates of metal bolted fast to the insides and outsides of the sides of the frame carrying the master-wheel, the inside pair forming the boxes for the master-wheel shaft. These plates have holes in their front ends, and the holes on one side of the master-wheel are fitted onto lugs on the boxes of the driving-pinion shaft, while those on the opposite side are fitted onto lugs which are secured to the main frame for that purpose, and placing a driver's seat on the rear portion of the frame carrying the master-wheel. The side pieces which support said seat have slots in them, which play up and down on screws or pins driven into the foot-board, or where there is no foot-board some other substitute rigidly connected with the main frame. Said slots and pins are used for the purpose of preserving the horizontal position of the seat when ascending and descending, and the driver's weight, when placed on this seat when mowing grass or cutting grain with the finger-piece resting on the ground, and said frame working on the above-mentioned flexible joint, will balance a large part of the weight of the machine; and while it thus relieves the pressure of the finger-piece on the ground and the pressure of the tongue on the horses' necks, it at the same time throws the whole weight thus made to balance each other on the ground-wheel, thus giving it such a hold on the ground that it is scarcely possible for it to slip; and when the team backs for the purpose of backing the machine the action of the gearing will have a tendency to lift or raise the main frame, finger-piece, cutters, &c., off the ground, and, together with the balancing-power of the driver's weight, will relieve the whole pressure of the frame-work on the ground, or so nearly so as to make the machine easily backed at all times.

To enable any one skilled in the manufacture to construct a machine with my improvements, I will proceed to describe them by referring to the drawings by letters.

A is the ground-wheel, hung in the frame B B', which is connected to the main frame C by a flexible joint at *a*.

D D are plates bolted on the inside of frame B B', and form the boxes for the master-wheel shaft on their inner surface, and have holes in their front ends which fit on lugs to form part of said flexible joint, while plates E E, being bolted on the outside of said frame, and having holes in their front ends similar to those in plates D D, and fit on lugs on the opposite sides from D D, thus making a joint of sufficient strength to support the ground-wheel and retain the driving-gear wheel in gear when running without any other connection with the main frame C.

F F are upright pieces, which support the driver's seat G between them, and are pivoted to the frame B B' at *b*, and have slots in them which permit them to ascend and descend, while they are held in their upright position by means of pins or screws *c c*, which pass through said slots into the feed-board O. This ascending and descending is caused by the unevenness of the surface over which the ground-wheel A passes.

T is the finger-piece, as shown in Figure 1.

U is a metal rod, passing through the divider just behind the finger-piece and about in range with the top of T, thence passing down under the frame of the platform and rising at the other end, passing through the rear of the main frame C, thus passing down from the top of T at the divider to near the bottom in the center, and up above the top at the main frame said brace-rod has a screw cut on each end, which receives nuts. Now it will be seen that by tightening said nuts said brace-rod U will elevate the center of said finger-piece T, and take off any sag or prevent its sagging by means of the weight it has to bear, as it is thus made self-supporting.

I do not claim the segmental plates D D separately as used to change the height of cut in relation to the frame B B', or their use when attached to the main frame for the purpose of rendering the cut adjustable in height; but What I do claim is—

1. Forming a joint at $a$ by means of plates D D, plates E E, and the lugs, as described, of sufficient strength to support the ground-wheel A and retain the driving cog-wheel in gear while running without any other connection with the main frame C C.

2. Placing the driver's seat on the opposite end of the frame B B' from the joint at $a$ in such manner that the driver's weight, when seated on it, shall balance some portion of the frame-work, &c., of the machine and throw the weights thus made to balance each other onto the wheel A, while the angle of the cutters and fingers is preserved.

3. Bracing the finger-piece so as to make it self-supporting, as described, and for the purposes set forth.

ABNER WHITELEY.

Witnesses:
JOHN L. SMITH,
THOS. C. LLOYD.